United States Patent [19]

VanScooter

[11] Patent Number: 5,028,956
[45] Date of Patent: Jul. 2, 1991

[54] FILM CLAMP

[75] Inventor: Paul E. VanScooter, Rochester, N.Y.

[73] Assignee: Eastman Kodak Company, Rochester, N.Y.

[21] Appl. No.: 601,849

[22] Filed: Oct. 22, 1990

[51] Int. Cl.⁵ .................. G03B 27/62; G03B 27/64
[52] U.S. Cl. ..................................... 355/72; 355/76
[58] Field of Search ................... 355/72, 75, 76, 133

[56] References Cited

U.S. PATENT DOCUMENTS

| | | | |
|---|---|---|---|
| 2,824,491 | 2/1958 | Hoffmaster | 355/75 |
| 4,483,612 | 11/1984 | Binder | 355/76 |
| 4,761,675 | 8/1988 | Sawasaki | 355/76 |
| 4,955,632 | 10/1990 | Jadrich et al. | 355/76 |

Primary Examiner—L. T. Hix
Assistant Examiner—D. Rutledge

Attorney, Agent, or Firm—Donald D. Schaper

[57] ABSTRACT

A film clamp is disclosed which comprises a platen having an aperture in a flat working surface of the platen. A proximal gripping member is positioned to grip one edge of a film supported on the platen, and a distal gripping member is positioned to grip an opposite edge of the film. A bell crank is adapted to press the proximal gripping member into contact with a film on the platen and to press the distal gripping member into contact with the film and away from the proximal gripping member to place the clamped film in tension across the aperture. In order to provide a means for advancing the film relative to the aperture in the platen, a motor-driven endless belt is mounted on the platen adjacent the proximal gripping member, and the proximal gripping member bears against the belt to grip the film.

26 Claims, 3 Drawing Sheets

FILM CLAMP

CROSS REFERENCE TO RELATED APPLICATION

Reference is made to U.S. Application, Ser. No. 442,375, entitled "A Film Clamp," filed on Nov. 28, 1989; this application is assigned to the assignee of the present invention.

BACKGROUND OF THE INVENTION

1. Field of the Invention

The present invention relates to a film clamp for use in apparatus such as a film scanner, and more particularly, to a film clamp for holding a film extremely flat in a film gate in such apparatus.

2. Description of the Prior Art

In various types of imaging apparatus, a photographic film must be clamped in a work station while a particular operation is performed on the film. In certain types of apparatus, for example, film scanners, the film must be held extremely flat in order for an image on the film to be recorded properly. One problem in maintaining the film flat is that photographic film has a natural curl due to an emulsion coated on one side of the film.

In a conventional film clamp, as illustrated in FIGS. 1 and 2, a film 1 is clamped against a platen 3 on all four sides of a rectangular aperture 5 by a vertical force represented by arrows 7. In the use of such a film clamp, the natural curl in the film 1 will be retained, and the film will not be held flat. Further, when all sides of the film 1 are clamped, any thermal variation of the film that occurs while the film is clamped can cause the film to buckle.

A further problem in known film clamps for film scanners is that it is difficult to advance short strips of film in the film gate relative to a scan beam of light. Normally, the film advance mechanism is located outside of the film clamp, for example, rollers operating on the film at opposite sides of the film clamp, and thus, the minimum length of film which can be handled is controlled by the distance between the rollers.

SUMMARY OF THE INVENTION

It is an object of the present invention to overcome the problems in the prior art described above and to provide a film clamp which is adapted to hold a film very flat in a film gate and to advance short strips of film in the film gate.

In accordance with the present invention, there is provided a film clamp comprising: a platen having a flat working surface for receiving a strip of film thereon; means for advancing the film relative to the platen; a first gripping member mounted for movement into a position along one portion of the platen to grip a film on the platen, the first gripping member cooperating with the advancing means to grip the film; a second gripping member mounted for movement into a position along a second portion of the platen to grip the film between the platen and the second gripping member; and means for pressing the first and second gripping members toward the platen to grip the film.

In one embodiment of the present invention, the film clamp comprises a platen having a flat working surface and a rectangular aperture in the surface. A proximal gripping member can be positioned to hold a film against the platen along one side of the film, and a distal gripping member can be positioned to hold the film against the platen along an opposite side of the film. The gripping members are mounted on resilient arms, and the gripping members are pressed toward the film by means of a bell crank which acts on the resilient arms. The gripping members function such that the proximal gripping member is moved toward the platen to grip the film first. The distal gripping member is then moved toward the platen and into contact with the film; upon contact with the film, a force on the distal gripping member in a direction away from the proximal gripping member tensions the film to hold the film flat on the platen. In order to provide a means for moving the film relative to the platen, a motor-driven endless belt mounted on the platen can be actuated to position a selected frame on the film relative to the aperture. The proximal gripping member is positioned to bear against the belt to grip the belt.

A principal advantage of the present invention is that a short strip of film can be advanced in a film gate, and once the film is positioned in the gate, the film can be held very flat in order to facilitate the scanning of the film. A further advantage is that the film advance mechanism is incorporated in the film clamp in a manner which simplifies the structure and reduces the cost of the device.

Other features and advantages will become apparent upon reference to the following description of the preferred embodiment when read in light of the attached drawings.

BRIEF DESCRIPTION OF THE DRAWINGS

In FIG. 7A, the film is held under the film advance mechanism. In FIG. 7B, both sides of the film are clamped, and the film has been tensioned.

DESCRIPTION OF THE PREFERRED EMBODIMENT

Figure 1:
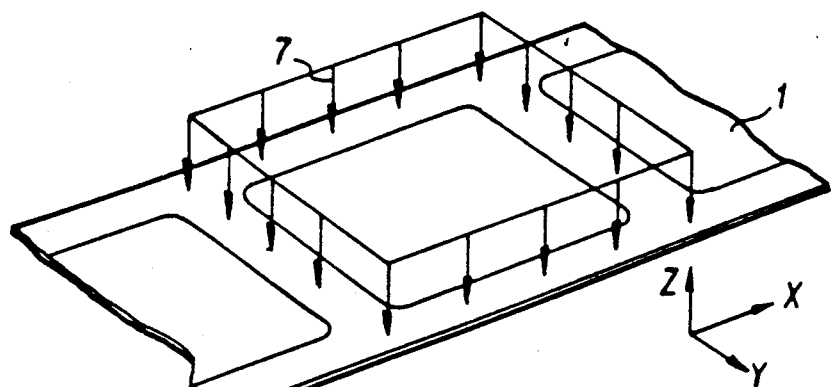
FIG. 1 is a perspective view in free body diagram form which illustrates the operation of a conventional film clamp.
Figure 2:
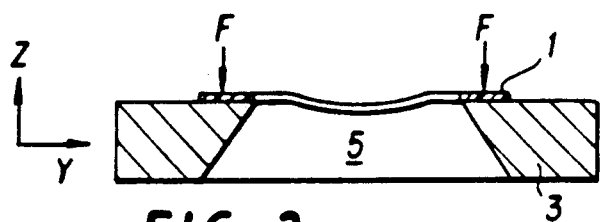
FIG. 2 is a cross-sectional view in free body diagram form which further illustrates the operation of a conventional film clamp.
Figure 3:
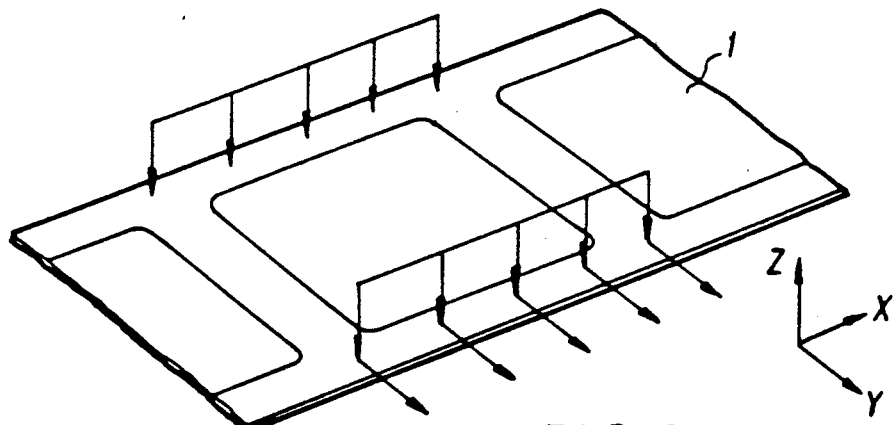
FIG. 3 is a perspective view in free body diagram form which illustrates the operation of a film clamp according to the invention.
Figure 4:
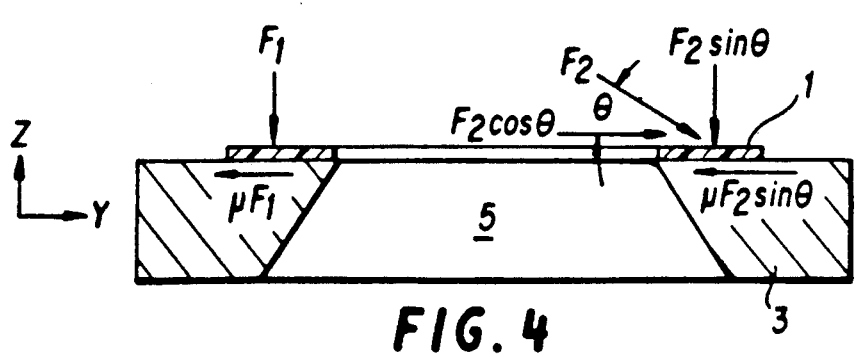
FIG. 4 is a cross-sectional view in free body diagram form which further illustrates the operation of a film clamp according to the invention.

With reference to FIGS. 3 and 4, there are shown diagrams in free body form which illustrate the operation of one aspect of the film clamp of the present invention. In FIG. 4, a film 1 is supported over a rectangular aperture 5 in a platen 3. Note that, if $\mu$ is the coefficient of static friction between the film 1 and the platen surface, the following relationship must be maintained:

$$F_2 \cos \theta < \mu F_1 + \mu F_2 \sin \theta$$

Failure to meet the condition in the above relationship will result in slippage of the entire film 1 in the y direction when the force $F_2$ is applied.

In the aforementioned U.S. application, Ser. No. 442,375, entitled "Film Clamp," there is disclosed a film clamp which meets the conditions shown in the above relationship, and the disclosure of U.S. application Ser. No. 442,375, is expressly incorporated herein by reference. The film clamp disclosed in Ser. No. 442,375, comprises a proximal gripping member and a distal gripping member. Each gripping member includes a tie bar and a cylinder mounted on the tie bar which makes line contact with the film. Each gripping member is mounted on two arms which are intrinsically resilient and are made of beryllium copper. When the arms are pressed toward the platen by an actuator, the proximal gripping member contacts the film first, forcing the film toward the platen; the distal gripping member then contacts the film and presses the distal edge of the film both toward the platen and away from the proximal gripping member to place the film in tension.

Figures 5, 6:
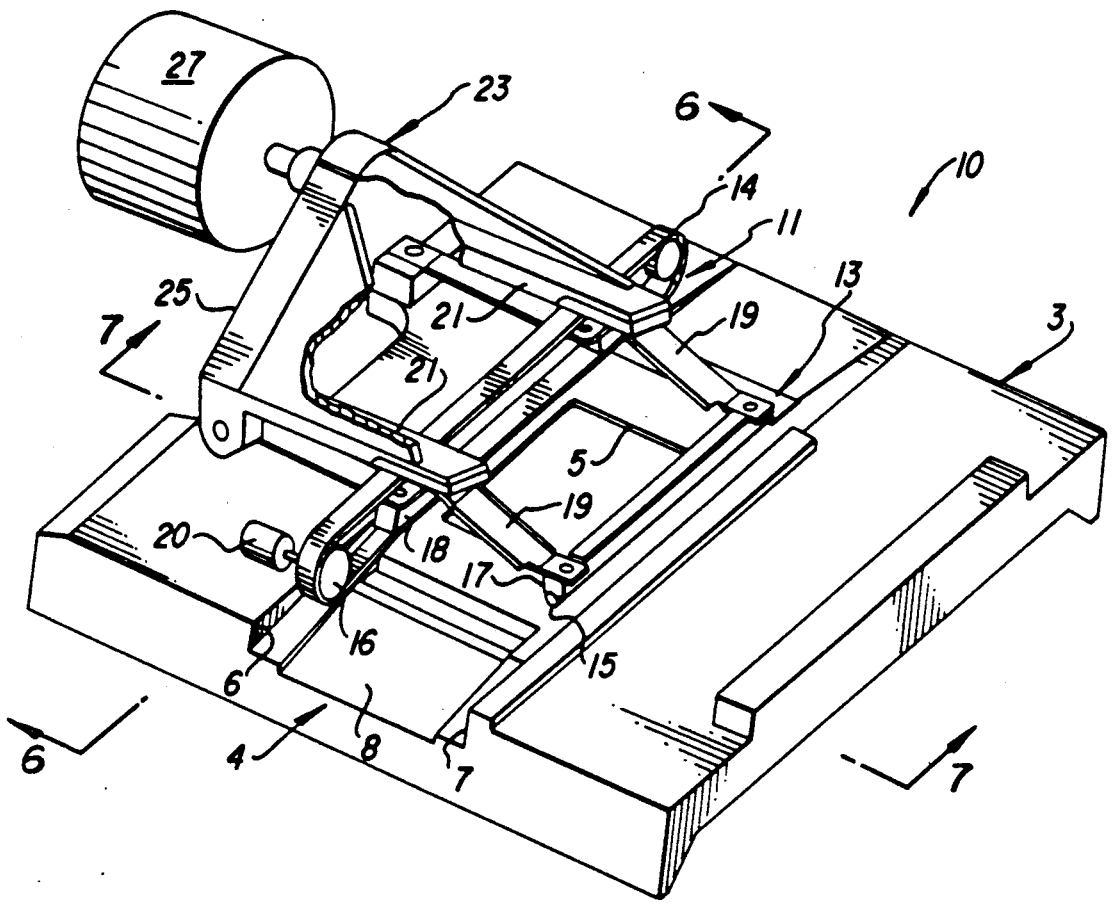
FIG. 5 is a perspective view of an embodiment of a film clamp according to the invention.
FIG. 6 is cross-sectional view taken along the line 6—6 in FIG. 5, with certain parts omitted.

A film clamp 10 constructed in accordance with a preferred embodiment of the present invention is shown in FIGS. 5 and 6. Film clamp 10 comprises a film track 4 which is defined by a proximal edge 6 and a distal edge 7. The track 4 includes inclined portions 8 at its opposite ends. The portions 8 form an angle of about 10° with a flat working surface 9 of the platen 3.

An endless belt 14 is provided to advance a film strip in track 4. Belt 14 is trained around pulleys 16 which are supported for rotation by means of bearing blocks (not shown) on platen 3. A motor 20 (FIG. 5) is adapted to drive one of the pulleys 16. As shown in FIG. 6, the vertical centerlines CL of the pulleys 16 are located such that belt 14 wraps over the inclined portions 8 of film track 4 in platen 3; this belt wrap is necessary to give the belt enough normal or downward force on the film 1 so that the film will advance when the belt is set in motion by motor 20. The amount of belt wrap necessary to advance the film is dependent on the coefficient of friction of the belt material and the coefficient of friction of the film track. In one exemplary arrangement, the belt is made from a urethane coated polyester, and the platen is made from anodized Teflon-aluminum.

Film clamp 10 further includes a proximal gripping member 11 and a distal gripping member 13. Gripping member 11 comprises a tie bar 18 which can be moved into contact with belt 14 to hold the film 1 in position during a scanning operation. Gripping member 13 comprises a cylinder 15 which makes line contact with the film 1 and a tie bar 17 which supports the cylinder 15. Each gripping member 11, 13, is mounted on two arms 19. The arms 19 are preferably intrinsically resilient, and they can, for example, be made of beryllium copper or an appropriate spring steel.

Each arm 19 can be pressed toward the platen 3 by a corresponding finger 21 of a bell crank 23. A third finger 25 of the bell crank 23 can be pivoted toward the platen 3 by an actuator 27 which can be a solenoid, an air cylinder, or a similar device. The intrinsic resiliency of the arms 19 returns them to the position shown in FIG. 7A when the actuator 27 does not bear against the third finger 25.

Figure 7A:
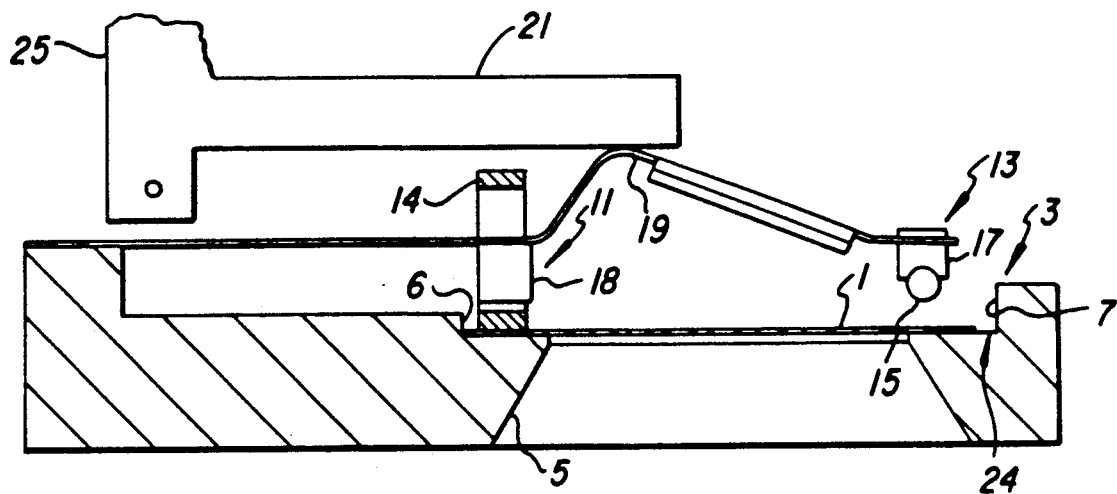
FIGS. 7A and 7B are cross-sectional views taken along the line 7—7 in FIG. 5.
Figure 7B:
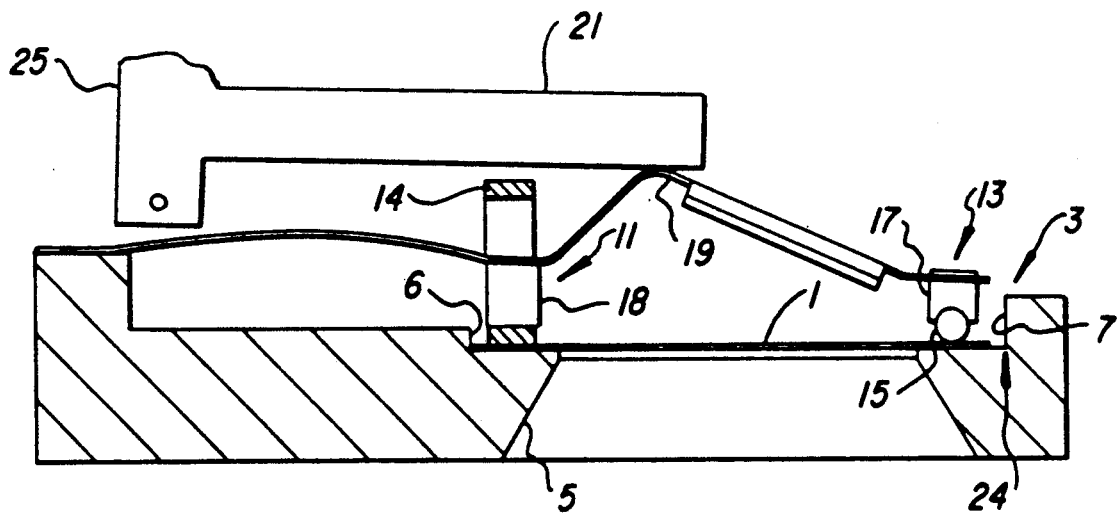

As best seen in FIGS. 7A and 7B, the arms 19 are preferably sized, shaped, and positioned so that, when the fingers 21 are pivoted toward the platen 3 by the actuator 27, the proximal gripping member 11 causes the belt 14 to grip the film 1 first, bearing at least essentially vertically against the proximal edge of the film 1 and forcing it toward the platen 3. Upon further movement of the fingers 21 by the actuator 27, the distal gripping member 13 contacts the film 1, pressing the distal edge of the film 1 both toward the platen 3 and away from the proximal gripping member 11 to place the film in tension.

When belt 14 is pressed against the film 1 by tie bar 18, the arms 19 flex, as shown in FIG. 7B; as this happens, a pawling action occurs which moves the film 1 against proximal edge 6 of the track 4. This action is very desirable, since it produces a gap 24 between the film 1 and distal edge 7 of the track 4. It is the gap 24 which allows the film 1 to be tensioned during the film clamping in order to produce the desired film flatness.

As can be seen from the foregoing, the belt 14 performs two functions in the present invention. When film clamp 11 is in the position shown in FIG. 7A, the belt 14 can be used to advance the film on the platen 3 in order to locate a frame on the film relative to aperture 5. When the film clamp 10 is in the position shown in FIG. 7B, the belt 14 functions in combination with tie bar 18 to hold the film 1 against platen 3 during a scanning operation.

In the film clamp of the present invention, the proximal gripping member 11 presses at least essentially vertically against the film 1, and the distal gripping member 13 presses both toward the platen 3 and away from the proximal gripping member 11, as illustrated by the arrow representing the force $F_2$ in FIG. 4. In the preferred embodiment of the present invention, there are preferably no gripping members on the lateral sides of the aperture 5, that is the sides of aperture 5 which extend between the proximal and distal sides of the film as defined herein. It will be apparent, however, that the film clamp of the present invention could operate in a position in which it is rotated 90° from the position in which it is shown in FIG. 5; in this case the gripping members would contact the film adjacent the lateral sides of the films. It is not essential to the invention that the distal and proximal gripping members be mounted on the same arms. However, the arrangement shown in the drawings has been found to be simple to manufacture and robust in use. Moreover, measurements using the disclosed film clamp 10 have shown that the film flatness is held to between 0.0010 inches and 0.0015 inches over a standard 35 mm image area; this is in contrast to a flatness of 0.004 inches –0.006 inches over a similar area provided by a conventional four-sided film clamp. Similar improvements in film flatness can be obtained in other sizes of film.

The invention has been described in detail with particular reference to a preferred embodiment thereof, but it will be understood that variations and modifications can be effected within the spirit and scope of the invention.

I claim:
1. A film clamp comprising:
   a platen having a flat working surface for receiving a strip of film thereon;
   means for advancing the film relative to said platen;
   a first gripping member mounted for movement into a position along one portion of the platen to grip a film on the platen, said first gripping member cooperating with said advancing means to grip said film;
   a second gripping member mounted for movement into a position along a second portion of the platen to grip the film between said platen and said second gripping member; and means for pressing said first and second gripping members toward said platen to grip said film.

2. A film clamp, as defined in claim 1, wherein said pressing means presses said first gripping member toward said platen and said second gripping member toward said platen and away from said first gripping member.

3. A film clamp, as defined in claim 1, wherein said pressing means is adapted to move the first gripping member to grip said film on the platen before the second gripping member is moved into contact with the film.

4. A film clamp, as defined in claim 1, wherein said advancing means includes an endless belt.

5. A film clamp, as defined in claim 4, wherein said first gripping member is movable into contact with said belt to grip said film.

6. A film clamp, as defined in claim 4, wherein said platen comprises a track which includes said working surface and has first and second edges at opposite sides of said surface.

7. A film clamp, as defined in claim 6, wherein said film is moved against said first edge by the action of said first gripping member.

8. A film clamp, as defined in claim 7, wherein said film is tensioned in the direction of said second edge when said second gripping member is moved into contact with said film.

9. A film clamp, as defined in claim 4, wherein said track includes inclined portions at opposite ends thereof.

10. A film clamp, as defined in claim 4, wherein said belt is disposed to have a wrap on a film held between said belt and said platen.

11. A film clamp comprising: a platen having a flat working surface and an aperture in said flat working surface, said aperture having a first side and a second side;

means for advancing a film relative to said platen;

a first gripping member sized, shaped, and positioned to extend along said first side of said aperture and to grip a film between said platen and said first gripping member;

a second gripping member sized, shaped, and positioned to extend along said second side of said aperture and to grip the film between said platen and said second gripping member; and means for pressing said first gripping member generally perpendicularly toward said platen and said second gripping member toward said platen and away from said first gripping member whereby one edge of the film can be held in position by said first gripping member and a second edge of the film is pushed down on said platen and away from said first gripping member.

12. A film clamp, as defined in claim 11, wherein said pressing means presses said first and second gripping members resiliently toward said platen.

13. A film clamp, as defined in claim 12, wherein said pressing means comprises an arm to which each of said first and second gripping members is attached.

14. A film clamp, as defined in claim 11, wherein said arm is made out of beryllium copper.

15. A film clamp, as defined in claim 12, wherein said pressing means comprises two arms, each of said first and second gripping members being attached to both of said two arms.

16. A film clamp, as defined in claim 11, wherein said pressing means comprises an arm to which each of said first and second gripping members is attached.

17. A film clamp, as defined in claim 11, wherein said pressing means comprises two arms, each of said first and second gripping members being attached to both of said two arms.

18. A film clamp, as defined in claim 11, wherein said second gripping member makes substantially line contact with the film.

19. A film clamp, as defined in claim 11, wherein said second gripping member is pressed toward said platen and away from said first gripping member after said first gripping member has gripped the film.

20. A film clamp, as defined in claim 11, wherein said pressing means comprises two arms, each of said first and second gripping members being attached to both of said two arms, and said pressing means further comprises a bell crank for pressing against said two arms.

21. A film clamp, as defined in claim 20, wherein said pressing means further comprises an actuator that bears against said bell crank.

22. A film clamp, as defined in claim 20, wherein each of said two arms is resilient.

23. A film clamp, as defined in claim 20, wherein each of said two arms is made out of beryllium copper.

24. A film clamp comprising:

a platen having a surface for receiving a strip of film thereon;

first gripping means mounted for movement between one position in which the film can be advanced on the platen and a second position in which the film is secured in a desired position on said platen, said first gripping means including means for moving said film in a first direction when the first gripping means is moved from said first position to said second position;

second gripping means mounted for movement between one position in which the film can be advanced on the platen and another position in which the film is secured in said desired position on the platen, said second gripping means including means for tensioning said film in a direction opposite to said first direction when the second gripping means is moved from said one position to said other position; and means for moving said first gripping means between said first and second positions and said second gripping means between said one and other positions.

25. A film clamp, as defined in claim 24, wherein the clamp includes means for advancing the film on said platen.

26. A film clamp, as defined in claim 25, wherein said first gripping means cooperates with said advancing means to secure the film in said desired position.

* * * * *